(12) United States Patent
Bickel et al.

(10) Patent No.: US 6,265,701 B1
(45) Date of Patent: Jul. 24, 2001

(54) METHOD AND APPARATUS FOR INDUCTIVE PREHEATING AND WELDING ALONG A WELD PATH

(75) Inventors: David Bickel, Oshkosh; Mark Ulrich, New London; Donald Wiseman, Neenah, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/502,256

(22) Filed: Feb. 17, 2000

Related U.S. Application Data

(63) Continuation of application No. 09/052,541, filed on Mar. 31, 1998, now abandoned.

(51) Int. Cl.$^7$ .............................. B23K 13/01; B23K 9/00
(52) U.S. Cl. ........................................ 219/617; 219/136
(58) Field of Search ................................ 219/617, 618, 219/610, 136, 137, 61.2, 130.01, 124.34, 602, 607, 612, 137 PS, 130.31, 121.11, 137 R

(56) References Cited

U.S. PATENT DOCUMENTS

| | | |
|---|---|---|
| 2,365,958 | 12/1944 | Holslag et al. . |
| 2,416,047 * | 2/1947 | Dolan .................................... 219/670 |
| 3,288,982 * | 11/1966 | Sukuki et al. .................... 219/137 R |
| 3,725,629 | 4/1973 | Vickers . |
| 3,849,871 | 11/1974 | Kaunitz et al. . |
| 3,946,349 | 3/1976 | Haldeman, III . |
| 4,160,967 | 7/1979 | Beech . |
| 4,188,419 | 2/1980 | Detert et al. . |
| 4,222,023 | 9/1980 | Beech . |
| 4,426,565 * | 1/1984 | Ruter ............................... 219/130.01 |
| 4,728,761 * | 3/1988 | Mucha et al. ........................ 219/639 |
| 4,950,348 | 8/1990 | Larsen . |
| 5,101,086 | 3/1992 | Dion et al. . |
| 5,118,028 * | 6/1992 | Ogawa et al. ....................... 228/194 |
| 5,140,123 * | 8/1992 | Mitani ................................ 219/61.2 |
| 5,208,433 | 5/1993 | Hellegouarc'h et al. . |
| 5,319,179 * | 6/1994 | Joecks et al. .................... 219/137 R |
| 5,343,023 * | 8/1994 | Geissler ............................... 219/661 |
| 5,352,871 | 10/1994 | Ross et al. . |
| 5,412,184 | 5/1995 | McGaffigan . |
| 5,461,215 | 10/1995 | Haldeman . |
| 5,466,916 | 11/1995 | Iguchi et al. . |
| 5,504,309 | 4/1996 | Geissler . |
| 5,526,561 | 6/1996 | McGaffiggan . |
| 5,710,413 | 1/1998 | Moe . |
| 5,714,738 | 2/1998 | Hauschulz et al. . |
| 5,739,506 | 4/1998 | Hanton et al. . |
| 5,773,799 * | 6/1998 | Maxfield et al. ..................... 219/661 |
| 5,783,799 * | 7/1998 | Geissler ......................... 219/137 PS |
| 6,043,471 * | 3/2000 | Wiseman et al. .................... 219/662 |
| 6,107,602 * | 8/2000 | Geissler et al. ................. 219/130.31 |

FOREIGN PATENT DOCUMENTS 2663491   6/1990   (FR) .

OTHER PUBLICATIONS

Eliminating welding disruption for pipe and other application, Nov. 1991, The Fabricator.

400 Cycle Induction Heating with proportional control for Preheating and Stress Relieving or Welding Joints. Hobart Booklet.

Instructions Installation–Operation–Maintenance for High Frequency Induction Heaters Specs 4438, Hobart Brothers Co. Booklet.

400 Cycle Completely "automatic proportional" or manual control Brochure.

* cited by examiner

*Primary Examiner*—Tu Ba Hoang
(74) *Attorney, Agent, or Firm*—George R. Corrigan

(57) ABSTRACT

A method and system for system for welding a workpiece is disclosed. The workpiece is preheated while the weld is being performed. The preheating is performed fast enough that it can be done on-the fly-immediately in advance of the weld. The preheating is preferably accomplished with an induction heating system. The induction coil is mounted with the welding torch such that as the torch is moved along the weld path, the coil precedes it, preheating the weld path.

18 Claims, 2 Drawing Sheets

METHOD AND APPARATUS FOR INDUCTIVE PREHEATING AND WELDING ALONG A WELD PATH

This is a continuation of application Ser. No. 09/052,541 filed on Mar. 31, 1998 now abandoned.

FIELD OF THE INVENTION

The present invention relates generally to the art of welding. More specifically, it relates to welding relatively thick material, such as steel pipes or plates, which require pre-heating of the weld path.

BACKGROUND OF THE INVENTION

It is well known to weld large and relatively thick pieces of steel (or other material) together. For example, pipes are often formed by taking a flat piece of steel and rolling the steel. A longitudinal weld is then made along the ends of the rolled steel, thus forming a section of pipe. A pipe line may be formed by circumferential welding adjacent sections of pipe together. Other applications of welding relatively thick steel (or other material) include ship building, railroad yards, tanker trucks, or other higher strength alloy welding.

When welding such relatively thick steel (or other material) it is generally desirable to preheat the workpiece along the weld path. (As used herein "weld path" refers to the path along which the weld will be made, or has been made.) Pre-heating is used to raise the temperature of the workpiece along the weld path because the filler metal binds to the workpiece better when the weld path is heated, particularly when a high-alloy steel is being welded. Without preheating there is a greater likelihood that the filler metal won't properly bind with the workpiece, and a crack may form. (As used herein "preheating" a weld path means heating the workpiece along the weld path to a pre-weld temperature, or a temperature sufficient to reduce the likelihood of a crack forming along the weld path. Generally, the steel is preheated to about 300° F. prior to welding. Preheating is often used for heating steel having a thickness of more than about ½".

Generally, in the prior art, "rose buds" (gas fired flame torches) are used to preheat the steel. The rosebuds are placed along the weld path, typically one rosebud on each side of the weld path, or one covering both sides of the weld path, every 3 to 6 feet. The rosebuds are left in place a relatively long period of time (for example up to two hours for 3" thick steel). After the weld path has been preheated, the rose buds are removed and the weld is performed before the weld path cools. Other methods of preheating a weld path include placing the entire workpiece in an oven (which takes as long as using a rosebud), induction heating, or resistance heating wires. When preheating with these alternatives in the prior art, the heating device is placed at one location on the weld path until that location is heated. Then the weld is performed and the heating device is moved. The preheating has not been done on-the-fly because the heating took much longer than the welding.

Rose buds have also been used in the prior art to dry the weld path prior to welding. In such an application the rose bud will be passed over the weld path immediately prior to welding. However, the rose bud is not applied for a length of time sufficient to preheat the weld.

Unfortunately, the use of rose buds or the other known prior art pre-heating techniques, takes an undesirable long time to heat the weld path. This results in unnecessary down time while the welder is waiting for the weld path to be preheated. In other words a rose bud or other prior art does not heat as the weld path as the weld is being performed, i.e not on-the-fly, so that the welder must wait for the preheating to be completed before welding that portion of the weld path.

Accordingly, a system for preheating weld path is desirable. Preferably, such a system will heat the weld to a pre-weld temperature immediately prior to the weld being performed. Such a system will preferably be able to preheat as fast as the weld can be performed so that as the weld is being performed on one portion of the weld path, a nearby portion is being preheated.

SUMMARY OF THE PRESENT INVENTION

According to one aspect of the invention a system for welding a workpiece includes a welding power supply and a welding torch connected to the power supply. An induction coil is connected to an induction power supply. The induction coil is adapted to be disposed near the welding torch such that as the torch is moved, the induction coil is moved, and the weld path is preheated on-the-fly.

The induction coil is in a fixed position relative to the torch in one alternative, and mounted with the torch in another alternative. Preferably, the induction coil is mounted such that as the torch is moved along a weld path, the induction coil precedes the torch.

The induction heating power supply includes capacitors that may be changed to adjust the frequency of an induction output in one alternative, and the induction heating power has an adjustable frequency output.

A robot is included in another alternative. The robot moves the welding torch and the induction coil.

Another aspect of the invention is a method of welding a workpiece that includes providing power to a welding torch and providing power to an induction coil. Also, the induction coil is disposed near the workpiece to heat a weld path on the workpiece. The welding torch is also disposed near the weld path, and the weld is performed while the workpiece and weld path are heated by the coil.

One alternative to this aspect includes holding the induction coil in a fixed position relative to the torch. Another alternative is adjusting the frequency of the power applied to the induction coil, by, for example, changing a capacitance of a power supply that supplies the power to the induction coil. Yet another alternative is to place the torch and coil in a robot, which moves the torch and coil along the weld path.

A third aspect of the invention relates to a welding torch. An induction coil is mounted with the torch such that as the torch is moved the induction coil is moved. An alternative provides that the induction coil is in a fixed position relative to the torch. Preferably, the induction coil is mounted such that as the torch is moved along a weld path, the induction coil precedes the torch along the weld path. According to another alternative the torch is adapted to be mounted on a robotic arm.

Yet another aspect of the invention is a system for welding a workpiece that includes a welding power supply connected to a welding torch. A heating device that heats the workpiece to at least a pre-weld temperature as the workpiece is being welded is also included. The heating device is adapted to be disposed near the welding torch such that as the torch is moved the heating device is moved.

The heating device is in a fixed position relative to the torch, and preferably mounted with the torch in alternative embodiments. Also, in another alternative, the heating device is mounted such that, as the torch is moved along a weld path, the heating device precedes it.

A fifth aspect of the invention is a method of welding a workpiece that includes providing power to a welding torch and pre-heating the workpiece along a weld path as a prior portion of the weld path is being welded. The weld path is heated to at least a pre-weld temperature. The welding torch is disposed near the weld path, wherein the weld is performed while the workpiece and weld path are heated to at least the pre-weld temperature.

The step of preheating include preheating a portion of the weld path a fixed distance from the welding torch in an alternative. The torch is moved robotically in another alternative.

Other principal features and advantages of the invention will become apparent to those skilled in the art upon review of the following drawings, the detailed description and the appended claims.

Figure 1:
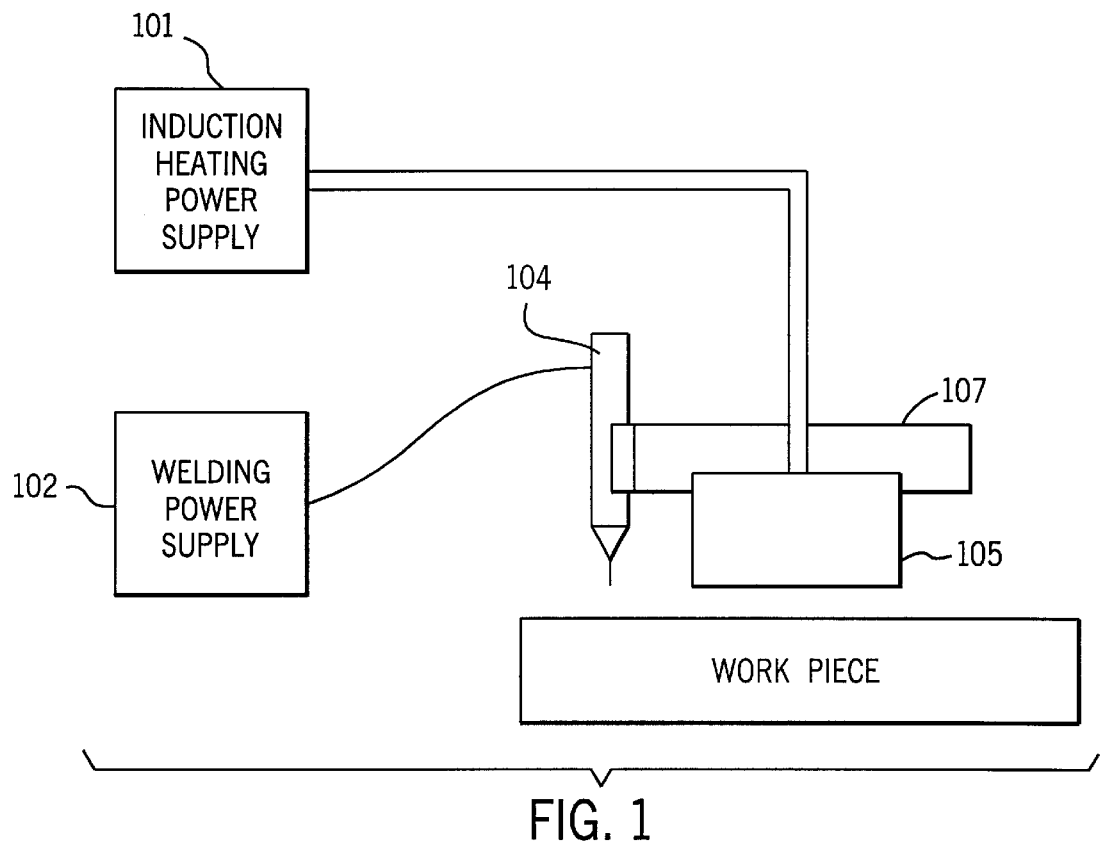
FIG. 1 is a diagram of a welding system implementing the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system and a particular torch and coil, it should be understood at the outset that other torches, power supplies, coils, and mountings may be employed for implementing this invention.

Generally, the present invention includes preheating a weld path on-the-fly as the weld is being performed. An induction coil and induction heating power supply is used to preheat the weld path in the preferred embodiment. Induction heating power supply, as used herein, refers to a power source that is capable of providing power to an induction coil (or head) to induce heat in a metallic workpiece. An induction heating power supply may include a controller, cable, and other equipment used with the induction coil to effectively heat the workpiece. Induction coil, as used herein, refers to a conductor with current flowing therein, which heats a workpiece by induction.

More specifically, in the preferred embodiment, the induction coil is mounted with a welding torch such that the induction coil passes over the weld prior to the welding torch. (As used herein welding torch refers to a torch, gun, or other device used to create an arc with the workpiece.) Power is supplied to the torch by a welding power supply, which may include a power source, a controller, cables and other equipment used to effectively provide the welding power to the arc. MIG welding is performed in the preferred embodiment. However, the invention can be implemented with any type of welding including MIG, TIG, SUBARC, or FCAW.

The coil is mounted near the torch, i.e. such that as the torch is moved along the weld path the coil immediately precedes the torch. Power is applied to the coil such that the coil preheats the weld path to at least a pre-weld temperature as the coil passes along the weld path in front of the torch. The coil is near enough to the torch that the weld path remains at or above the pre-weld temperature (about 300° F. in one embodiment) while the welding torch is moved along the path. The workpiece is steel with a thickness of about ⅝ inch, or within a range of about ½" to about 6" or more", in the preferred embodiment.

Output power to the induction coil is controlled, in the preferred embodiment, in response to workpiece size and weld speed. Generally, more power is needed for a large workpiece. Also, as weld speed is increased, power to the induction coil is increased automatically. An alternative control is to adjust power in response to direct or indirect temperature measurement (using infrared emission or direct contact of RTD or a thermocouple, e.g.). Power to the coil is then regulated about a desired setpoint using a control loop such as a PID loop. Other alternatives includes other controls, or a user adjusted output.

Referring now to FIG. 1 the preferred embodiment of the present invention includes an induction power supply 101, a welding power supply 102, a welding torch 104, induction coil 105, and mounting mechanism 107. Output cables directly connect induction coil 105 to induction power supply 101, and a welding cable directly connects welding power supply 102 to welding torch 104 in the preferred embodiment. Other embodiments provide for an indirect connection, such as power being provided through a wire feed to torch 104 by power supply 102, however the power supplies remain in electrical communication with the torch and coil.

The welding power supply used in the preferred embodiment is a Miller XMT 304®, which is described in U.S. Pat. No. 5,783,799 and U.S. Pat. No. 6,107,602, both of which are owned by the assignee of the present invention, and hereby incorporated by reference. Generally, the invention may be implemented with any power supply. The induction heating power supply used in the preferred embodiment is a Miller 5KW IHPS®, and is described in U.S. Pat. No. 5,343,023 (hereby incorporated by reference) which includes an output invertor that operates preferably at an adjustable frequency of between 25 KHz and 50 KHz. Alternatives includes using other induction heating power supplies, such as that described in U.S. Pat. No. 6,043,471 (hereby incorporated by reference) or U.S. patent application Ser. No. 08/635,771. The welding and induction heating power supplies are combined into a single unit in an alternative embodiment.

The induction heating power supply in the preferred embodiment is tuned for the coil and workpiece by changing capacitors within the induction heating power supply. This allows for more efficient power transfer.

Generally, in the preferred embodiment, the induction coil is approximately 8" long (in the direction parallel to the seam to be welded) and 4½" to 5" wide (in the direction perpendicular to the seam). Coil 105 is mounted with torch 104 such that the direction of the weld is from the torch to the coil. The size of coil 105 is preferably determined based upon the desired weld speed and material thickness. A faster weld speed, or thicker material, may require a longer (in the weld path direction) coil to sufficiently preheat the weld path.

It takes approximately 10 seconds for the preferred coil, using the preferred power supply, to heat a weld path on a 5/8" steel plate workpiece to about 300° F. Thus, in accordance with the present invention, when the person performing the weld (or the robot performing the weld) moves the torch 8 inches or less in 10 seconds, the metal will be heated on-the-fly as the weld is being performed.

Figure 2:
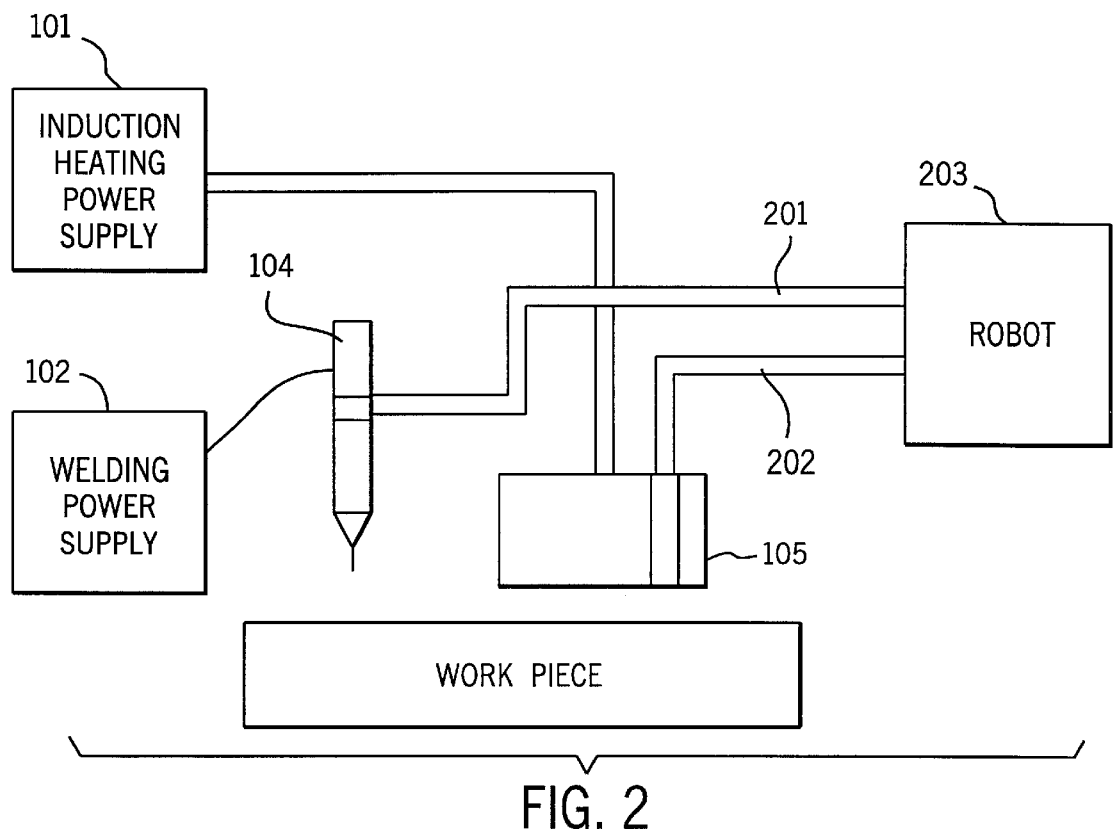
FIG. 2 is a diagram of a welding system having a robot implementing the present invention.

Alternatives include a robot (or robotic arm or arms), to which the torch and coil are mounted, such that the robotic arm (or arms) move the torch and coil along the weld path. This alternative is shown in FIG. 2, where torch 104 is mounted on with coil 105 using robotic arms 201 and 202, which are connected to a robot 203. (As used herein coil 105 is "mounted with" torch 104 when there is some physical connection, direct such as will be described with reference to FIG. 3, or indirect such as shown in FIG. 2, between the two.

Other alternatives using heating devices other than an induction heating system to heat the weld path. However, the heating device should be able to heat the weld path sufficiently fast that the weld path can be heated on-the-fly as the weld is formed.

Figure 3:
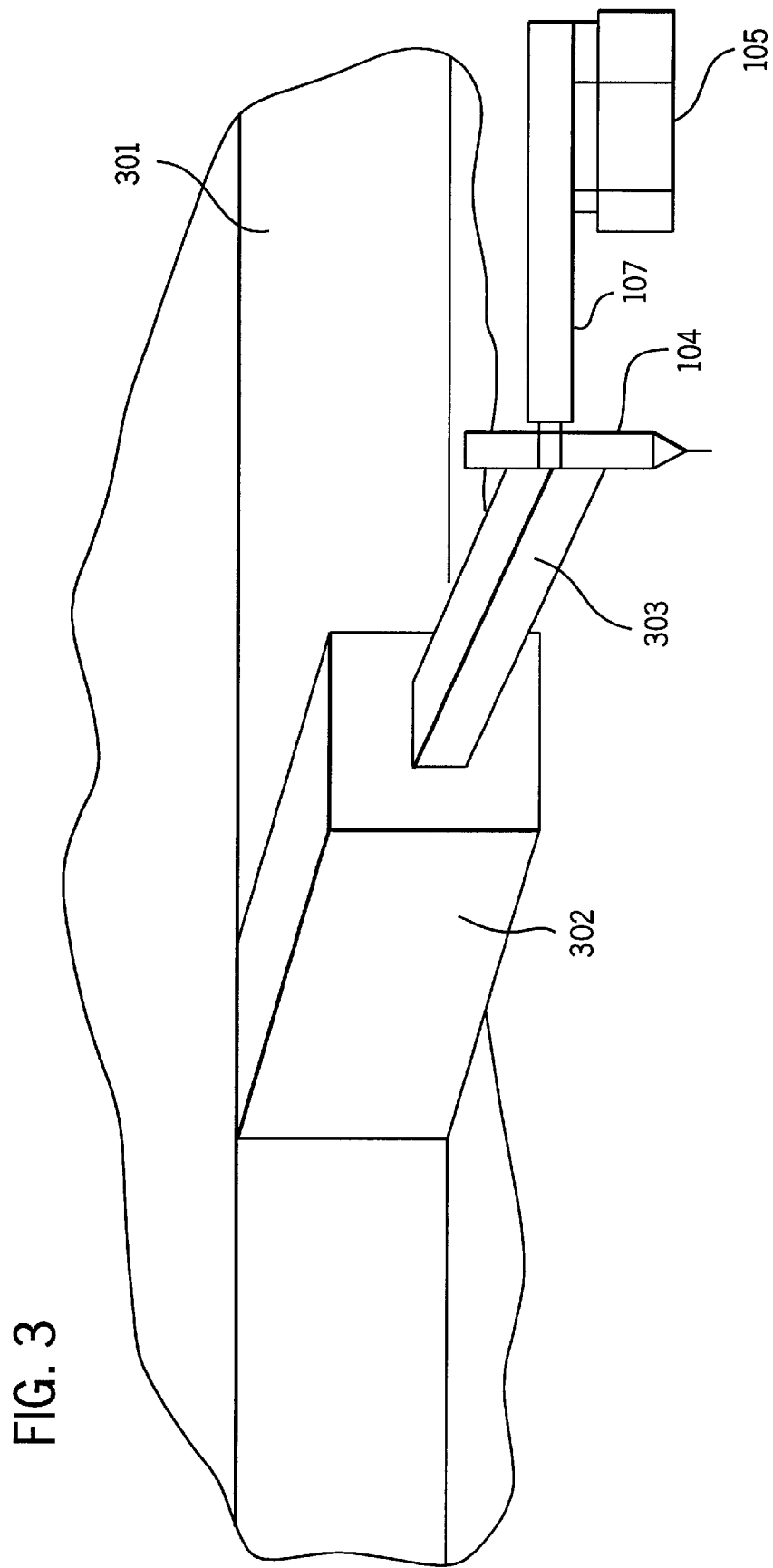
FIG. 3 is diagram of a welding torch mounted with an induction coil in accordance with the present invention.

Referring now to FIG. 3, one embodiment of mounting mechanism 107 is shown. A controller 302 rides along a track 301. A bracket 303 is mounted on controller 302. Torch 104 is mounted to bracket 303 (by, e.g., c-clamps). Such a mounting mechanism is known in the art, such as the Miller Travel Master SB 100®. Bracket 107 is added to bracket 303, and coil 105 is mounted thereon. The invention includes any movement of the torch and coil relative to the workpiece. For example, one alternative embodiment includes moving the workpiece and having the torch and coil remain stationary. As used herein the torch and coil move along the weld path when there is movement of the torch or the coil relative to the weld path (i.e. the workpiece may be moved while the torch and coil are not moved).

Numerous modifications may be made to the present invention which still fall within the intended scope hereof. Thus, it should be apparent that there has been provided in accordance with the present invention a method and apparatus for preheating and welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property is claimed are defined as follows:

1. A system for welding a workpiece, along a weld path comprising;
   a welding power supply;
   a welding torch in electrical communication with the power supply;
   an induction heating power supply having an output at a frequency of less than 50 KHz; and
   an induction coil in electrical communication with the induction heating power supply, wherein the induction coil is adapted to be disposed near the welding torch such that as the torch is moved relative to said weldpath to perform welding on said workpiece the induction coil is moved with the torch, to preheat said workpiece along said weld path.

2. The welding system of claim 1, wherein the induction coil is in a fixed position relative to the torch.

3. The welding system of claim 1, wherein the induction coil is mounted with the torch.

4. The welding system of claim 3, wherein the induction coil is mounted such that as the torch moves relative to the weld path, the induction coil precedes the torch along the weld path.

5. The welding system of claim 1, wherein the induction coil is further adapted to be moved relative to a weld path preceding the torch along the weld path.

6. The welding system of claim 1, wherein the induction heating power supply includes capacitors that may be changed to adjust the frequency of an induction output.

7. The welding system of claim 1, further comprising means to automatically move the welding torch and the induction coil.

8. The welding system of claim 1, wherein the induction heating power supply has an adjustable frequency output.

9. A method of welding a workpiece along said weld path comprising;
   providing power to a welding torch;
   providing power to an induction coil at an output frequency of less than 50 KHz;
   moving the induction coil along said weld path so that said, wherein the weld path on the workpiece is preheated by the coil;
   moving the welding torch along the weld path with the coil, so that a weld is performed at said weldpath, wherein said coil is disposed near said torch such as said torch is moved the coil is moved along with said torch.

10. The method of claim 9, including holding the induction coil in a fixed position relative to the torch.

11. The method of claim 9, including the step of adjusting the frequency of the power applied to the induction coil.

12. The method of claim 11, wherein the step of adjusting the frequency includes changing a capacitance of a power supply that supplies the power to the induction coil.

13. The method of claim 9 including automatically moving the torch and coil along the weld path.

14. A system for welding a workpiece along a weld path comprising;
   a welding power supply means for supplying welding power;
   a welding torch means for applying an arc to the workpiece along said weld path, wherein the torch means is in electrical communication with the power supply means;
   an induction heating power supply means having an output at a frequency of less than 50 KHz for supplying power induction heating power; and
   an induction coil means for inducing current in said workpiece along said weldpath for preheating said workpiece along saud weldpath, wherein the induction coil means is in electrical communication with the induction heating power supply means, and means for moving the induction coil means and the torch means that as the torch means is moved the induction coil means is moved with the torch.

15. The welding system of claim 14, wherein the means for moving includes means for holding the induction coil means in a fixed position relative to the torch means.

16. The welding system of claim 14, wherein the means for holding includes means for mounting the induction coil means for moving the induction coil means along a weld path, preceding the torch means.

17. The welding system of claim 14, wherein the induction heating power supply means includes tuning means for adjusting the frequency of an induction output.

18. The welding system of claim 14, wherein the means for moving includes a means for automatically moving the welding torch means and the induction coil means.

* * * * *